United States Patent
Haselden et al.

(10) Patent No.: US 7,788,662 B2
(45) Date of Patent: Aug. 31, 2010

(54) AUTOMATIC UPGRADE OF PLUGGABLE COMPONENTS

(75) Inventors: J. Kirk Haselden, Sammamish, WA (US); Matthew E. David, Sammamish, WA (US); Mohammed F. Shatnawi, Redmond, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/900,827

(22) Filed: Jul. 28, 2004

(65) Prior Publication Data

US 2006/0026585 A1 Feb. 2, 2006

(51) Int. Cl.
*G06F 9/44* (2006.01)
*G06F 9/445* (2006.01)

(52) U.S. Cl. .................. 717/170; 717/116; 717/171; 717/176; 719/332

(58) Field of Classification Search .................. 717/168
See application file for complete search history.

(56) References Cited

U.S. PATENT DOCUMENTS

| | | | | |
|---|---|---|---|---|
| 5,680,551 A | * | 10/1997 | Martino, II | 709/226 |
| 6,223,344 B1 | * | 4/2001 | Gerard et al. | 717/170 |
| 6,356,901 B1 | * | 3/2002 | MacLeod et al. | 707/6 |
| 6,418,555 B2 | * | 7/2002 | Mohammed | 717/169 |
| 6,564,376 B1 | * | 5/2003 | Froehlich et al. | 717/170 |
| 6,658,659 B2 | * | 12/2003 | Hiller et al. | 717/170 |
| 6,948,059 B1 | * | 9/2005 | Sprecher et al. | 713/100 |
| 7,412,501 B2 | * | 8/2008 | Sanghvi et al. | 709/223 |
| 2001/0044935 A1 | * | 11/2001 | Kitayama | 717/11 |
| 2002/0100017 A1 | * | 7/2002 | Grier et al. | 717/120 |
| 2003/0120688 A1 | * | 6/2003 | Hill et al. | 707/203 |
| 2003/0145315 A1 | * | 7/2003 | Aro et al. | 717/170 |
| 2004/0168153 A1 | * | 8/2004 | Marvin | 717/120 |

OTHER PUBLICATIONS

"An Experimental, Pluggable Infrastructure for Modular Configuration Management Policy Composition", Lingen et al., May 2004, pp. 573-582, <http://delivery.acm.org/10.1145/1000000/999461/21630573.pdf>.*

"Pluggable verification modules: an extensible protection mechanism for the JVM", P. Fong, Oct. 2004, pp. 404-418, <http://delivery.acm.org/10.1145/1030000/1029010/p404-fong.pdf>.*

"The design and performance of a pluggable protocols framework for real-time distributed object computing middleware", O Ryan et al., Apr. 2000, pp. 372-395, <http://delivery.acm.org/10.1145/340000/338384/p372-o_ryan.pdf>.*

(Continued)

*Primary Examiner*—Tuan Q Dam
*Assistant Examiner*—Thuy Dao
(74) *Attorney, Agent, or Firm*—Woodcock Washburn LLP

(57) ABSTRACT

When a component is to be loaded or executed, the version of the component to be loaded may be compared with available versions of the component. If an upgraded version of the component is available, the upgraded version of the component may be enabled to dynamically and deterministically update itself. The component may be an object in an object model. The upgraded version of the component may update itself by calling an update method. The component may be upgraded with minimum user intervention, dynamically as the object is loaded.

18 Claims, 5 Drawing Sheets

OTHER PUBLICATIONS

Salo, T. et al., "Object Persistence:Beyond Sterilization", *Dr. Dobbs Journal*, May 1999, 19,22,24-27,30-33.

Schoettner, M. et al., "Type Evolution and Version Management in a Persistent Distributed Operating System", *Proceedings of the LASTED International Conference, Software Engineering and Applications*, 2001, 119-124.

Verma, V. et al., "A New Approach to Version Management for Databases", *AFIPS Conference Proceedings-National Computer Conference*, 1987, 645-651.

Wileden, J.C. et al., "PGRAPHITE: An Experiment in Persistent Typed Object Management", *Proceedings of the ACM SIGSOFT/SIGPLAN Software Engineering Symposium on Practical Software Development Environments*, 1988, 130-142.

\* cited by examiner

AUTOMATIC UPGRADE OF PLUGGABLE COMPONENTS

FIELD OF THE INVENTION

The invention relates to keeping persistent software state in sync with the current software version and in particular to automatically upgrading pluggable components in an object model.

BACKGROUND OF THE INVENTION

Keeping persistent software state and persistent state of the components used by the software updated and in sync with the current version of the software and the components is a ubiquitous problem in computer science. Suppose, for example, that version one of an application is designed to work with version one of a component. The component may be, for example, a dataset providing input to the application. Suppose further that the creation of the dataset is a non-trivial task. Now suppose that a new version, version two, of the application becomes available. The new version of the application may require a new format for the dataset. Attempting to load the previous version of the dataset into the new version of the application typically results in failure.

It would be helpful if there were an easy way to upgrade persistent state of the revised components to a format compliant with the new version of the components, automatically, so that it "just works".

Within the context of an object model, typically an application object model is extensible through the creation of user-created objects and objects provided by third-party vendors. It would be helpful if a version of an object model application and a version of components (objects) associated with the object model application could be sensed. It would also be helpful if the presence of new versions of components could be sensed and if new versions of components exist, the persistent state associated with the old versions of the components could be automatically upgraded to a format compliant with the new version. It would also be helpful if this could be done automatically as components are being loaded from persistent storage.

SUMMARY OF THE INVENTION

When a component is to be loaded or executed, the version of the component to be loaded may be compared with available versions of the component. If an upgraded version of the component is available, the upgraded version of the component may be enabled to dynamically and deterministically update itself. The component may be an object in an object model. The upgraded version of the component may update itself by calling an update method. The component may be upgraded with minimum user intervention, dynamically, as the object is loaded.

Metadata associated with an outdated component for which an upgraded version of the outdated component is available may be modified automatically with minimal user intervention. The metadata may be updated dynamically as a result of attempting to load or execute the outdated component.

The outdated component and/or the upgraded component may be an object in an object model, the object associated with metadata. An updated version of the object may be available, requiring an updated version of the metadata. The metadata associated with the outdated component may be modified in place to generate updated metadata compatible with the upgraded component. The metadata may be modified automatically with minimal user intervention dynamically upon initiation of a load or execute operation.

The outdated component and/or the upgraded component may be pluggable. The outdated component and/or the upgraded component may be provided by a software vendor, created by a user or provided by a third party.

Serialization refers to the process of receiving an object and converting its state information into a form that can be stored or transported. An object writes its current state, usually indicated by the value of its member variables, to temporary storage (e.g., memory or network streams) or to persistent storage. The object can be re-created by reading, or deserializing, the object's state from storage. In some embodiments of the invention, the serialized data representing the potentially outdated object is metadata presented in XML or in another suitable language or form capable of capturing metadata. The XML or other suitable language or form may be modified to generate metadata representing or describing the updated component.

Upon receiving a load request, in some embodiments of the invention a DTS (Data Transformation Services) persistence engine may determine if a component such as the object defined by the XML metadata is outdated. An outdated package or container may include the metadata for one or more components (objects) for which a more current version may or may not be available. As the DTS engine loads the package, the DTS engine may attempt to update the metadata so that the updated metadata is compatible with the upgraded or more current component available in the object model.

In some embodiments of the invention, the DTS object model or application itself may be updated when a new version of the application software is shipped by the software vendor. The DTS persistence engine may determine the updateability of an existing package and may apply a series of transformations to it (e.g., to the existing XML) to update the existing package so that it is compatible with the updated version of DTS. For extensible objects, including user-developed objects and pluggable objects, the DTS persistence engine may enumerate through all the extensible objects of that type installed on the computer. (For example, to determine if the version of a connection manager defined by the metadata in the DTS package has been superseded by a more current version of the connection manager available in the object model, all the connection manager objects available in the object model runtime might be enumerated through. If a more current version of the connection manager is found in a registry of objects in the object model, the version of the connection manager defined by the metadata in the DTS package may have been superseded. In some embodiments of the invention, the object model may call an update method on the more current version of the object, resulting in updating of metadata, or persistent state, to the most current format. In some embodiments, the persisted data for the instance of the outdated object is passed to the instance of the updated object through the Update( ) method, and the XML is changed in place in the serialized package. The updated serialized package may be persisted.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
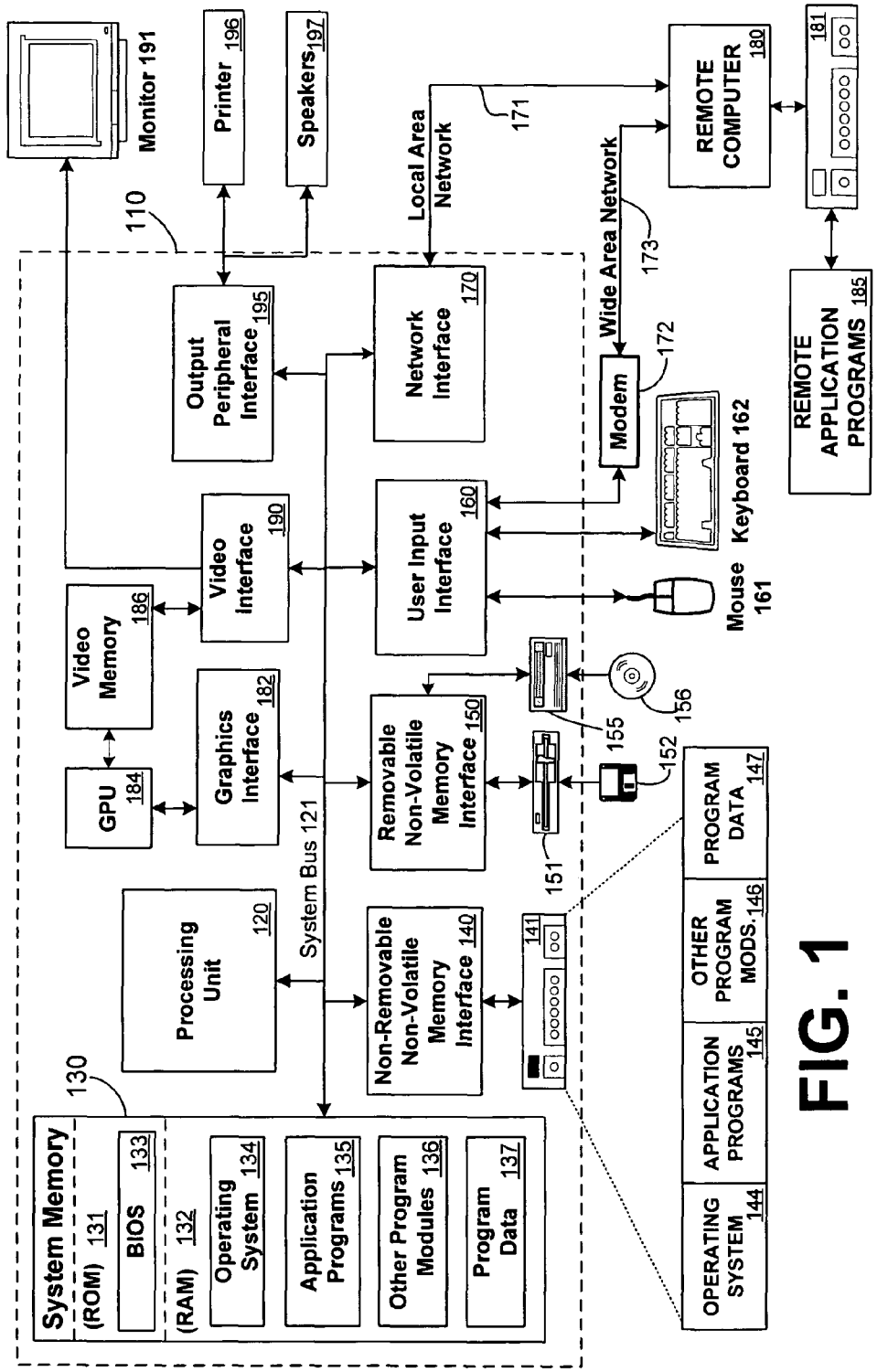
FIG. 1 is a block diagram showing an exemplary computing environment in which aspects of the invention may be implemented.

An object model may be defined as a collection of objects and relationships. Each of the objects may be associated with one or more properties that govern the execution behavior of the object.

In an illustrative implementation, a Data Transformation Service (DTS) provides a set of tools that allows for the extraction, transformation/consolidation and loading of data from one or more sources into one or more destinations supported by DTS connectivity. By using DTS tools to graphically build DTS packages or by programming a package with the DTS object model, custom data movement solutions tailored to the specialized business needs of an organization may be created. The components of DTS may be implemented as objects in a data transformation object model.

A DTS package is an organized collection of connections, DTS tasks, DTS transformations and workflow constraints assembled either programmatically or with a DTS tool and saved to Microsoft® SQL Server™, or to an XML file. Generally, each package includes one or more steps that are executed sequentially or in parallel when the package is run. When executed, the package connects to the appropriate data source(s), extracts data from the source(s), (optionally) transforms the data, and loads the transformed data into one or more destinations.

A DTS package may include one or more extensible objects such as tasks, connection managers, logging providers, "for each" enumerators, and so on. A DTS task is a discrete set of functionality, executed as a step in a DTS package. Each task defines a work item to be performed as part of the data movement and data transformation process, or as a job to be executed. Examples of commonly used DTS tasks include importing and exporting data, transforming data, copying database objects, and sending messages to and receiving messages from other users and packages, and so on. A DTS transformation may include one or more functions or operations applied to a piece of data before the data is loaded into the destination. A DTS transformation may be composed of a number of DTS sub-transformations, connected together into a transformation chain; that is, the output of a first sub-transformation may be input to the next sub-transformation in the chain and so on.

A DTS connection manager establishes valid connections to source and destination data and to any additional data sources (for example, lookup tables). A DTS connection manager enables connections to data stored in a wide variety of OLE DB-compliant formats as well as custom or nonstandard formats. The following varieties of connections and others are enabled:

a data source connection to standard databases including but not limited to Microsoft SQL Server™ 2000, Microsoft Access 2000, Oracle, dBase, Paradox; OLE DB connections to ODBC data sources; Microsoft Excel 2000 spreadsheet data; HTML sources; and other OLE DB providers.

a file connection. When specifying a text file connection, the format of the file may be specified (e.g., whether a text file is in delimited or fixed field format, whether the text file is in a Unicode or an ANSI format, the row delimiter and column delimiter if the text file is in fixed field format, the text qualifier, whether the first row contains column names.

a data link connection, in which an intermediate file outside of SQL Server stores the connection string.

A logging provider generates messages associated with the execution of a package and provides failure and other types of notifications. Logging and failure notification options may be accessed by setting an output file to which notifications are set. Business rules may be applied to data without writing code for scheduling, logging, notification of failure or completion, or file downloading.

The DTS runtime is an execution environment that handles the execution time behavior of the objects in the DTS object model. A component of the DTS runtime is the DTS engine or DTS persistence engine (terms used interchangeably herein) which may load a DTS package for execution by the DTS runtime and/or may persist a package to stable storage. In addition to the vendor-provided DTS runtime, DTS engine and DTS tasks, connections, log providers and so on, users and third parties can provide pluggable extensible components for use with the DTS system.

In accordance with some embodiments of the invention, the version of the DTS package and the DTS object model and/or a component or components thereof may be automatically sensed and updated. Version serialization may be employed to update the outdated DTS package with an updated version of the DTS object model and/or a component or components thereof. The DTS object model may be vendor-supplied while extensible objects may come from the vendor supplying the DTS system or from third parties.

In some embodiments of the invention, one or more properties including UpdatePackage and/or UpdateObjects may be set on an object, although it will be understood that the invention is not limited to properties so named.

Serialization is the process of receiving an object and converting its state information into a form that can be stored or transported. An object writes its current state, usually indicated by the value of its member variables, to temporary storage (e.g., memory or network streams) or persistent storage. The object can be re-created by reading, or deserializing, the object's state from storage.

The serialized stream may be encoded using XML, SOAP, a compact binary representation, etc. A formatter object used to encode the serialized stream may determine the format. The formatter may be a pluggable component of a channel. A custom formatter can be plugged in to replace the standard XML or binary formatters. A pluggable formatter may allow the serialization of objects in supplied formats such as binary and SOAP. A custom formatter may be created.

The complement of serialization is deserialization, which converts a data stream into an object. Together, these processes allow data to be easily stored and transferred.

In some embodiments of the invention, a DTS engine serializes packages into XML. At load time, the DTS engine may determine if a package is an outdated version. When the DTS engine loads an outdated version of a package, the DTS engine may attempt to update the package.

In some embodiments of the invention, the DTS system is updated when a new version of the application software is shipped by the software vendor. The DTS runtime may determine the version of the existing package and apply a series of transformations to the old XML to update the package to be compatible with the newly installed version of DTS. For extensible objects, the DTS runtime may enumerate through all the extensible objects of that type installed on the computer. (For example, for an outdated connection manager, all the connection manager objects available in the object model may be enumerated through to determine if an updated connection manager is available.) In some embodiments of the invention, the object model calls a method (e.g., CanUpdate method) on each object to determine if the object is capable of upgrading the outdated object in the input. If the object reports that it is capable of upgrading the outdated object, the persisted data for the instance of the outdated object may be passed to the instance of the updating object through the Update( ) method. The Update( ) method applies some transformation to the data and returns the upgraded data, which may then be incorporated back in to the serialized package. The updated serialized package may be persisted again to finalize the upgrade process.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Automatic Updating of Pluggable Components

Figure 2:
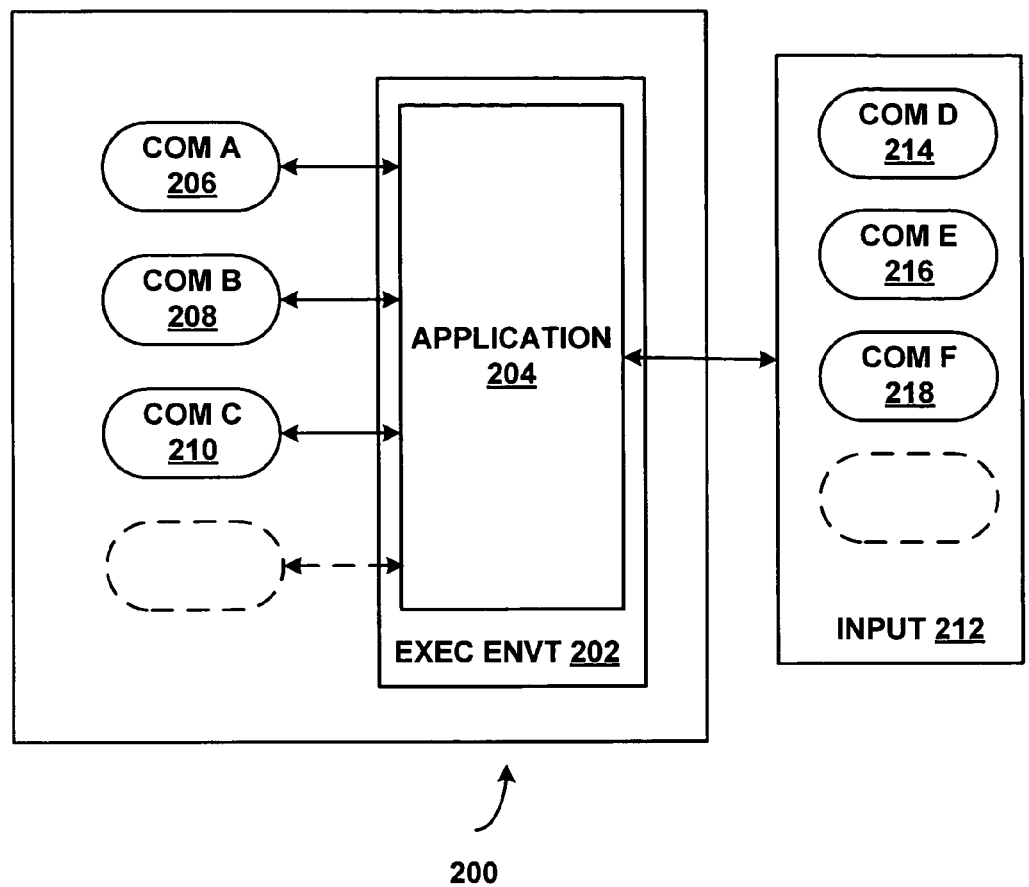
FIG. 2 is a block diagram of a system for automatic upgrading of pluggable components in accordance with one embodiment of the invention.

FIG. 2 is a block diagram of an exemplary system 200 for automatic updating of pluggable components in accordance with one embodiment of the invention. The system of FIG. 2 may reside on a computer such as computer 110 described above with respect to FIG. 1. Alternatively, system 200 may be distributed across one or more computers.

In FIG. 2, system 200 may comprise one or more of the following: an execution environment 202, an application 204, and one or more components represented in FIG. 2 by component A 206, component B 208, component C 210, etc. Components such as exemplary component A 206, component B 208, component C 210, etc. may be supplied by a software vendor supplying application 204 or may be supplied by a third party. Components such as exemplary component A 206, component B 208, component C 210, etc. may include sub-components. For example, component A 206 may include a subcomponent A1 (not shown) which may itself include a subcomponent A2 (not shown) and so on. It will be understood that a component may be nested to any suitable number of levels. Similarly, component A 206 may include one or more subcomponents such as subcomponent A1. Component A 206, component B 208, component C 210, etc. may be objects in an object model. Component A 206, component B 208, component C 210, etc. may be associated with a version or version information. That is, an initial component (e.g., version one of component A) may be provided and be subsequently modified or updated so that a new copy of the component (e.g., version two of component A) including the modifications or updates is subsequently provided.

System 200 may receive input 212 which may represent or include metadata for one or more components, represented in FIG. 2 by component D metadata 214, component E metadata 216, component F metadata 218, etc. Components such as those defined by exemplary component metadata D 214, component E metadata 216, component F metadata 218, etc. may be supplied by a software vendor supplying application 204 and/or execution environment 202 or may be supplied by a third party. Components such as those defined by exemplary component D metadata 214, component E metadata 216, component F metadata 218, etc. may include one or more sub-components. For example, the component defined by component D metadata 214 may include a sub-component D1 (not shown) and subcomponent D2 (not shown). Sub-components may themselves include subcomponents, that is, sub-component D1 may itself include a subcomponent D3 (not shown). It will be understood that a component or sub-component may be nested to any suitable number of levels. Components defined by Component D metadata 214, component E metadata 216, component F metadata 218, etc. may be objects in an object model. Component D metadata 214, component E metadata 216, component F metadata 218, etc. may be associated with a version or version information. That is, an initial version of a component may be provided and be subsequently modified or updated so that a new copy of the component including the modifications or updates is subsequently provided, as described above. The initial component may be referred to as an outdated component when an updated (more current) component version becomes available. The updating or upgrading may occur automatically (without user intervention) and dynamically (as the input is loaded or when an execution request has been entered).

In accordance with some embodiments of the invention, metadata for components such as component D metadata 214, component E metadata 216, component F metadata 218, etc. may be automatically updated or upgraded as described more fully below.

Figure 3:
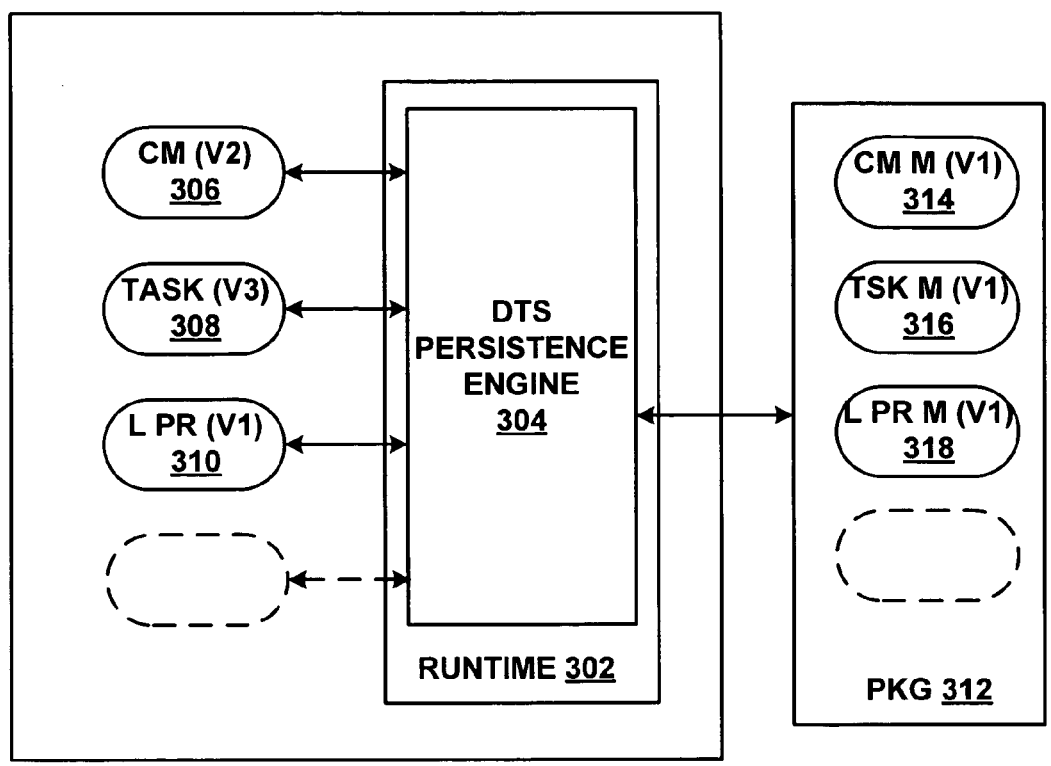
FIG. 3 is an exemplary implementation of a system for automatic upgrading of pluggable components in accordance with one embodiment of the invention.

FIG. 3 illustrates an exemplary implementation of the system of FIG. 2 in accordance with some embodiments of the invention. In FIG. 3, the execution environment comprises a Data Transformation Service (DTS) runtime 302 which may execute a DTS persistence engine 304. In accordance with some embodiments of the invention, DTS persistence engine 304 may receive a package 312 (e.g., a dataset specifying steps in a data transformation process) and may update or upgrade the components of the DTS package 312 to the most current available version of the components. Components may be supplied by the vendor supplying the DTS runtime 302 and the DTS persistence engine 304, by a user or by one or more third parties. One or more of the components may be pluggable.

For example, suppose the DTS object model is associated with or includes version 2 of a communication manager 306, version 3 of a task 308 and version 1 of a log provider 310. Suppose package 312 includes metadata for version 1 of the communication manager 314, metadata for version 1 of the task 316 and metadata for version 1 of the log provider 318. In accordance with some embodiments of the invention, package 312 may be upgraded to include metadata compatible with version 2 of the communication manager and metadata compatible with version 3 of the task. (Log provider metadata 318 may remain unchanged because a more current version of the log provider is not available within the DTS object model.) The process of upgrading the components is described more fully below.

Figure 4:
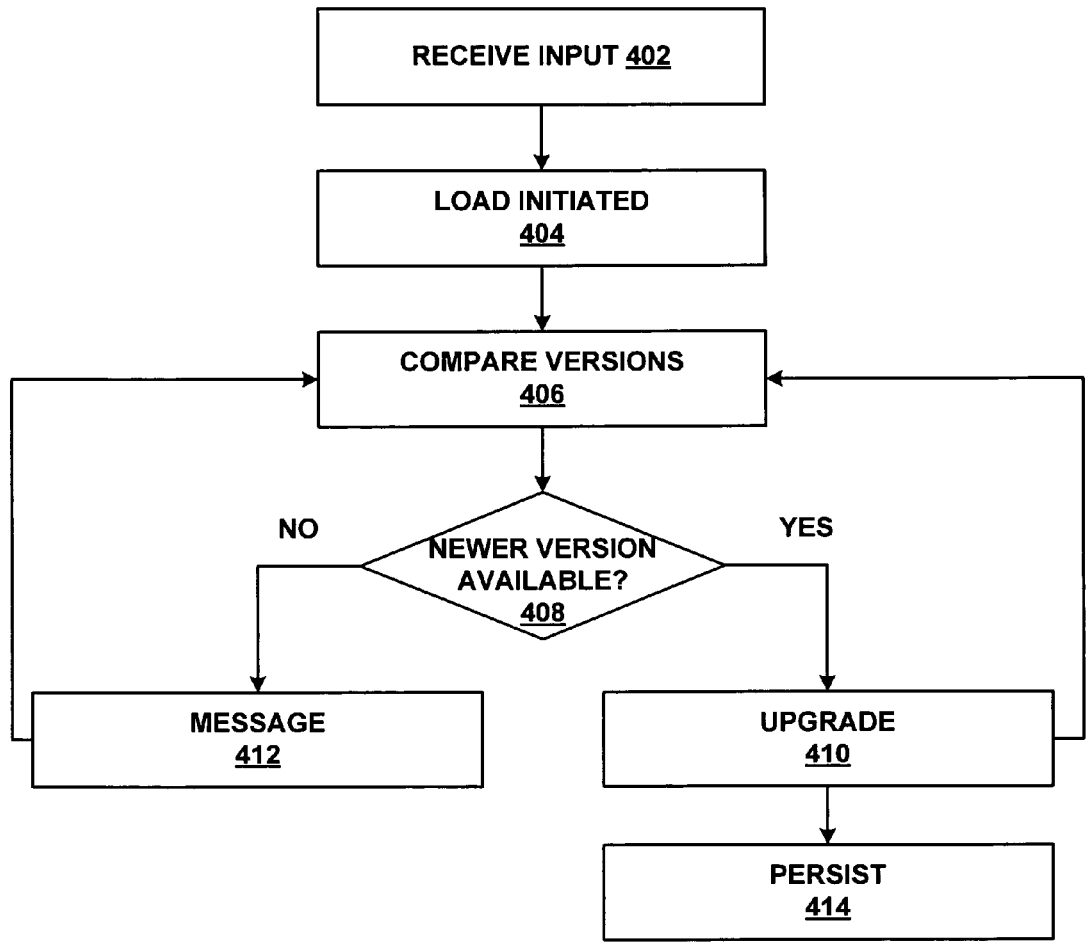
FIG. 4 is a flow diagram of a method for automatically upgrading pluggable components in accordance with one embodiment of the invention.

FIG. 4 is a flow diagram of an exemplary method for upgrading pluggable components automatically in accordance with some embodiments of the invention. One or more steps of the method may be optional. One or more of the steps of the method may precede a previous step. At step 402 input may be received to an application. The application may be implemented as an object model. The input may include the metadata for one or more components, as described above. One or more of the components described in the input may be a third party pluggable component. In some embodiments of the invention, the input received is a package in a DTS system. For example, suppose the package received includes metadata for version 1 of a communication manager provided by the software vendor with the DTS runtime. Suppose further that the package received includes metadata for version 1 of a task provided by a third party and metadata for version 1 of a log provider provided by a third party.

At step 404, a load may be initiated. The input to be loaded may be loaded in response to an execution command prior to execution or alternatively may be loaded into an editor or design tool prior to modification. For example, suppose package 312 is to be loaded.

At step 406, the version indicated in the metadata of the input may be compared with available versions of the component registered with the current version of the application installed. For example, suppose the input (e.g., a DTS package) includes metadata associated with version x of component A and metadata associated with version y of component B. The version number of component A may be compared with available versions of component A in the object model. Similarly, the version y of component B indicated by the metadata associated with component B may be compared with available versions of component B in the object model. More specifically, suppose component A is a log provider. The version of component A may be compared with all the versions of log providers available in the DTS application.

At step 408, if the available version(s) of the component in the object model are not more current than the version of the component indicated by the metadata associated with that component in the input, the metadata of the next component may be processed. At step 410, if the available version(s) of the component in the object model is more current than the version of the component indicated by the metadata for that component in the input, the metadata may be upgraded to be compatible with the more current version of the component. The modified metadata may be persisted. At step 412, if the version of the component defined by the metadata in the input is more current than that component available in the object model, a message may be returned and (optionally) error processing performed. Steps 406 and 408-412 may be repeated until all the metadata for all the components in the input (including all nested components) are processed. That is, to continue the example above, after the log provider component is processed, the communication manager may be processed next and so on until all the components in the input have been processed. At step 412 the input (e.g., DTS package) may be persisted.

In some embodiments of the invention, the version of the communication manager defined by the metadata in the DTS package may be compared with available versions of the communication manager in the DTS application. For example, version 1 of the communication manager defined by the metadata in the DTS package may be compared with version 2 of the communication manager in the DTS application. Assuming that version 2 is more current than version 1, the metadata defining version 1 of the communication manager may be modified to be compatible with version 2 of the communication manager.

Similarly, the version (version 1) indicated by the metadata for the task in the DTS package may be compared with available versions of the task in the DTS application (suppose version 3 of the task is available) and thus the metadata for version 1 of the task in the package may be modified to be compatible with version 3 of the task, again assuming that version 3 is more current than version 1.

Finally, the version of the log provider indicated by the metadata in the DTS package may be compared with available versions of the log provider in the DTS application. Both the package and the application have version 1 of the log provider, so in some embodiments of the invention, processing continues at the next step. Had a component in the package or a reference thereto been a more current version than the application version, say, for example, the log provider referred to in the package were version 3, in some embodiments, an error message would be returned and (optionally) error processing performed.

At step 414, the updated input may be persisted. The input may be persisted in a database, a file or in any suitable persisted state.

Figure 5:
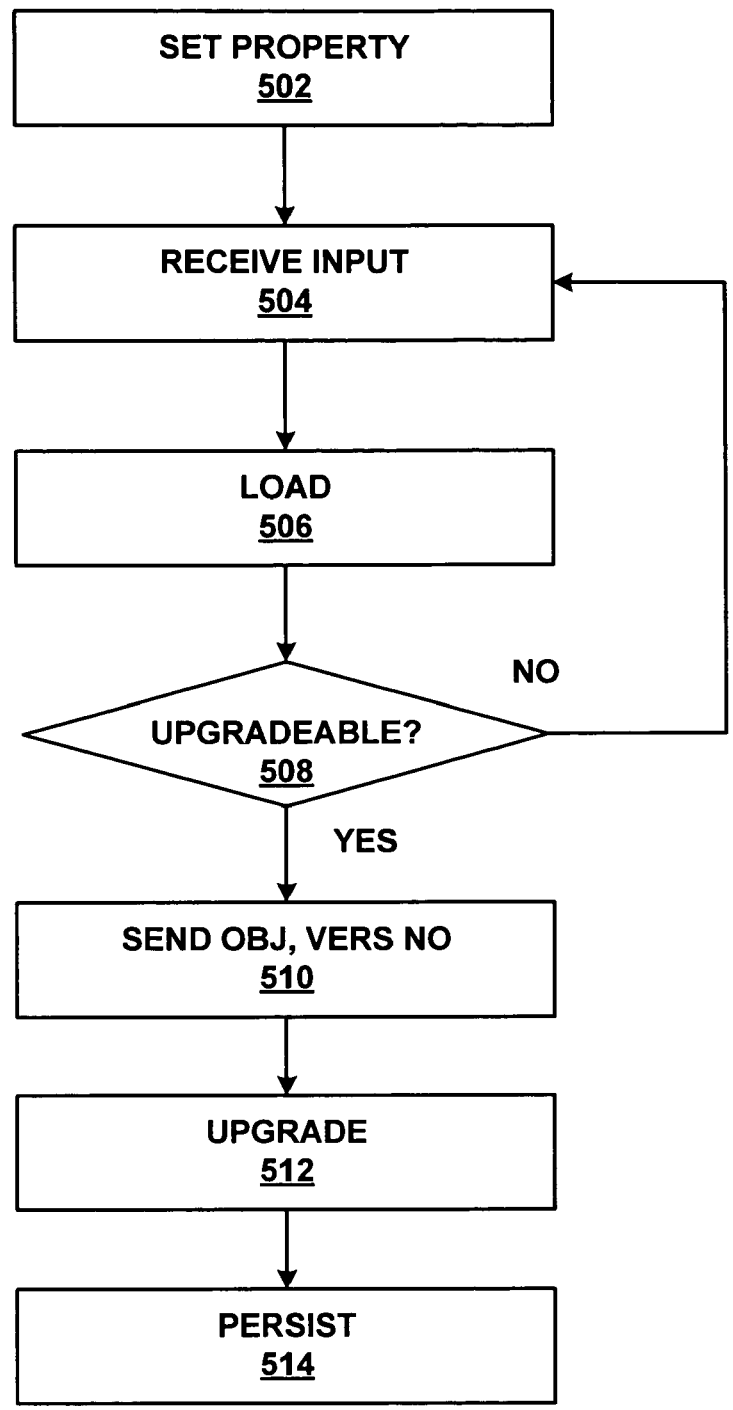
FIG. 5 is a more detailed flow diagram of a portion of the method of FIG. 4, in accordance with one embodiment of the invention.

FIG. 5 is a more detailed flow diagram of a portion of the method of FIG. 4 in accordance with some embodiments of the invention. One or more of the steps of the method of FIG. 5 may be optional. One or more of the steps of FIG. 5 may precede another step. In some embodiments of the invention, at step 502 a property is provided which enables an application to determine if a type of component used in the application is upgradeable. For example, in some embodiments of the invention, as described above, an UpdatePackage property is provided for a DTS package. Setting this property to "true" or "yes" may indicate that the package can be upgraded. Similarly, a component such as an object described by metadata within the package may be associated with an UpdateObjects property. Setting this property to "true" or "yes" may indicate that the object defined by the metadata within the package can be upgraded. In some embodiments of the invention, this step is not performed because components are assumed to be upgradeable. In some embodiments components are assumed to be not upgradeable. This property may be set for an object or objects.

At step 504 input to an application, as described above, may be received.

At step 506, a load may be initiated. In some embodiments of the invention, the input received is in the form of an XML file. The XML file may represent a serialized object, that is the metadata for the object may be represented in XML. In the load process, the XML nodes may be deserialized or converted back into objects within the DTS object model. The input may include one or more nodes, each node including metadata defining a component. Each of those components may include one or more components. A component in some embodiments of the invention, as described above, may comprise an object. The object may comprise one or more sub-objects. The load may be initiated for the purpose of execution. The load may be initiated for the purpose of modifying the input (e.g., the DTS package), as for example, within a design tool.

At step 508, the version of the component defined by the metadata in the input may be compared to one or more versions of the component in the object model. If the version of the component in the object model is more current than (i.e., is an upgraded version of) the version of the component received in the input to be loaded, in some embodiments of the invention, the application may make a call into the more current component and the component may determine if the upgrade can be performed. In some embodiments of the invention, the application may query the component to determine if the component is upgradeable. For example, the value of the UpdatePackage property or the UpdateObjects property may be requested. If the component cannot perform the upgrade, an error may be returned and processing may continue at step 504. If the value of the appropriate property indicates that the component is upgradeable, processing may continue at step 510. The newer more current component may be loaded. If the appropriate property indicates that the component cannot be upgraded, in some embodiments of the invention, the outdated version of the component is loaded. Alternatively, an error message may be displayed.

At step 510, in some embodiments of the invention, the application, in response to determining that the component is upgradeable, passes the outdated object and the version number of the outdated object to the upgraded version of the component for upgrading.

At step 512 the upgrade may be performed. In some embodiments of the invention, upgrading the component may entail updating an XML file, representing the serialized object or objects within the DTS package. In some embodiments of the invention, the upgrade is performed by calling an update method on the updated object. At step 514, the component may be persisted. For example, the updated XML file representing the serialized objects (the package) may be persisted.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A method of using a processor for automatically upgrading pluggable objects, comprising:
   receiving an input package comprising a dataset specifying steps in a data transformation process for an application implemented as an object model, the input comprising a metadata for an object, the metadata having a first version number;
   querying a property of the object in the object model to check a value that is set to one of two alternative states for indicating that the object can or cannot be upgraded irrespective of version number;
   comparing the first version number with a stored version number of the object, the stored version number contained in a registry of objects of the object model;
   in response to determining from the stored version number that the object in the object model is a newer version and said value of property is set for indicating that the object can be upgraded, automatically, without user intervention, modifying the first version number contained in the metadata in the input to be compatible with the stored version number contained in the registry of objects; and
   the object is a communications manager object or a log provider object, and the first version number contained in the metadata is metadata associated with said communications manager object or said log provider object, respectively.

2. The method of claim 1, wherein an UpdatePackage property is provided when the application comprises a Data Transformation Services (DTS) package, the UpdatePackage property indicative that the DTS package is upgradeable.

3. The method of claim 1, wherein the command is one of a) a load command and b) an execute command.

4. The method of claim 1, providing an error message in response to determining that the object is not upgradeable.

5. A system comprising a computer configured for automatically upgrading pluggable objects, comprising:
   a property value of a pluggable object, the property value operable to be set true or false for indicating that the pluggable object is upgradeable or not upgradeable respectively; and
   a persistence engine configured for receiving an input package from a source located external to the computer, the input package containing metadata pertaining to one or more pluggable objects of an object model resident at least in part, in the computer, the persistence engine further configured to dynamically compare a first version number contained in the metadata of the input package against a stored version number of a first pluggable object, and in response to determining that the stored version number corresponds to a newer version and the first version number corresponds to an outdated version, automatically updating the metadata in the input package by replacing the first version number contained in the metadata with the stored version number of the first pluggable object, the replacing being carried out subject to verifying that the property value has been set to true; and
   the first pluggable object is resident in the computer and is a communications manager object or a log provider object, and the outdated version of metadata contained in the input package is metadata associated with said communications manager object or said log provider object, respectively.

6. The system of claim 5, further comprising an update module, wherein the update module is called by the object model.

7. The system of claim 6, wherein the update module modifies the metadata.

8. The system of claim 5, wherein the persistence engine is further configured for comparing the first version number with a plurality of version numbers corresponding to a plurality of versions of the pluggable object that is a part of an application implemented as an object model.

9. The system of claim 5, wherein the persistence engine is further configured for generating an error message upon determining that the stored version number corresponds to an outdated version and the first version number corresponds to an updated version of the pluggable object.

10. The system of claim 5, wherein the persistence engine is further configured for loading the pluggable object having the first version number, which corresponds to an outdated version, when the property value of the pluggable object has been set to indicate that the pluggable object is not upgradeable.

11. The system of claim 5, wherein the persistence engine is a Data Transformation Services (DTS) persistence engine for executing a DTS package comprising the object model.

12. The system of claim 11, wherein an UpdatePackage property is associated with the DTS package for indicating that the DTS package is upgradeable.

13. The system of claim 5, wherein the first pluggable object is resident in the computer and is a communications manager object, and the outdated version of metadata contained in the input package is metadata associated with said communication manager object.

14. The system of claim 5, wherein the first pluggable object is resident in the computer and is a log provider object, and the outdated version of metadata contained in the input package is metadata associated with said log provider object.

15. A computer-readable storage medium comprising computer-executable instructions for:
   receiving input to an application implemented as an object model, the input comprising a metadata for an object, the metadata having a first version number;
   querying a property of the object in the object model to check a value that is set to one of two alternative states irrespective of version number, for indicating that the object can or cannot be upgraded;
   comparing the first version number with a stored version number of the object, the stored version number contained in a registry of objects of the object model; and
   in response to determining from the stored version number that the object in the object model is a newer version and said value of property is not set thereby indicating that the object can be upgraded, automatically, without user intervention, modifying the first version number contained in the metadata in the input to be compatible with the stored version number contained in the registry of objects; and
   the object is a communications manager object or a log provider object, and the first version number contained in the metadata is metadata associated with said communications manager object or said log provider object, respectively.

16. The computer-readable storage medium of claim 15, comprising further computer-readable instructions for:
   receiving a load command.

17. The computer-readable storage medium of claim 15, comprising
   further computer-readable instructions for:
   receiving an execute command.

18. The computer-readable storage medium of claim 15, comprising further computer-readable instructions for:
   querying a property on the object to check a value that is set for the property indicating that the object is upgradeable.

* * * * *